United States Patent
Asakimori et al.

(10) Patent No.: US 10,146,886 B2
(45) Date of Patent: Dec. 4, 2018

(54) INFORMATION PROCESSING SYSTEM AND METHOD FOR ADDING ADDITIONAL MODULES

(71) Applicants: Hiroki Asakimori, Tokyo (JP); Hiroyuki Inoue, Kanagawa (JP)

(72) Inventors: Hiroki Asakimori, Tokyo (JP); Hiroyuki Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 300 days.

(21) Appl. No.: 14/633,409

(22) Filed: Feb. 27, 2015

(65) Prior Publication Data
US 2015/0262544 A1 Sep. 17, 2015

(30) Foreign Application Priority Data
Mar. 14, 2014 (JP) .................................. 2014-051849

(51) Int. Cl.
*G06F 17/30* (2006.01)
*G06F 9/46* (2006.01)

(52) U.S. Cl.
CPC .......... *G06F 17/30905* (2013.01); *G06F 9/46* (2013.01); *G09G 2370/02* (2013.01)

(58) Field of Classification Search
None
See application file for complete search history.

(56) References Cited

U.S. PATENT DOCUMENTS

| 2007/0283253 A1* | 12/2007 | Asakimori | H04N 1/0097 713/182 |
| 2009/0089076 A1 | 4/2009 | Asakimori et al. | |
| 2009/0222925 A1* | 9/2009 | Hilaiel | G06F 21/53 726/25 |

(Continued)

FOREIGN PATENT DOCUMENTS

| JP | 2005-153473 A | 6/2005 |
| JP | 2010-009527 | 1/2010 |

(Continued)

OTHER PUBLICATIONS

Office Action dated Dec. 19, 2017 in Japanese Patent Application No. 2014-051849, 3 pages.

(Continued)

*Primary Examiner* — Maurice L McDowell, Jr.
*Assistant Examiner* — Donna J Ricks
(74) *Attorney, Agent, or Firm* — Oblon, McClelland, Maier & Neustadt, L.L.P.

(57) ABSTRACT

An information processing system includes an information processing apparatus and an apparatus connected to the information processing apparatus, the information processing apparatus including a processor, and a memory storing instructions which, when executed, cause the processor to act as a display control unit configured to acquire display data through a network and display a screen based on the display data. The display control unit is configured to input data specified in the display data to a first application, (Continued)

identified by identification information specified in the display data, among a plurality of applications installed in the information processing apparatus.

15 Claims, 9 Drawing Sheets

(56) References Cited

U.S. PATENT DOCUMENTS

| | | | |
|---|---|---|---|
| 2013/0014126 A1* | 1/2013 | Zana | G06F 9/54 |
| | | | 719/313 |
| 2013/0038893 A1 | 2/2013 | Katoh et al. | |
| 2013/0219261 A1* | 8/2013 | Han | G06F 17/22 |
| | | | 715/234 |
| 2014/0329467 A1* | 11/2014 | Ewing | H04B 1/3827 |
| | | | 455/41.2 |

FOREIGN PATENT DOCUMENTS

| | | |
|---|---|---|
| JP | 2011-141684 | 7/2011 |
| JP | 2012-162044 | 8/2012 |
| JP | 2013-140634 A | 7/2013 |
| JP | 20113-168113 A | 8/2013 |

OTHER PUBLICATIONS

Office Action dated Jul. 10, 2018, in corresponding Japanese Patent Application No. 2014-051849, 19 pages.

\* cited by examiner

INFORMATION PROCESSING SYSTEM AND METHOD FOR ADDING ADDITIONAL MODULES

BACKGROUND OF THE INVENTION

1. Field of the Invention

The present invention relates to an information processing system, an information processing method, and a computer program product.

2. Description of the Related Art

Japanese Laid-Open Patent Publication No. 2011-141684 discloses an image forming apparatus which does not require updating firmware at a time of adding or changing a software function. This image forming apparatus is adapted to customize a job using the software function even when the image forming apparatus is in an off-line state and disconnected from an external device.

Software functions that can be requested from a web page to a web browser are restricted to functions supported by APIs (application programming interfaces) which are supplied by the web browser. For example, scripts that can be described in a web page are restricted to what can be interpreted by the web browser.

For example, when a new function is implemented in an apparatus which has downloaded the web page, there is the necessity of modifying the web browser to permit supply of the interface supporting the new function to the web page in order to enable the new function to be used by the web page.

However, it is difficult for the image forming apparatus disclosed in Japanese Laid-Open Patent Publication No. 2011-141684 to reduce the necessity of modifying the web browser to permit supply of the interface supporting the new function to the web page in order to enable the new function to be used by the web page.

SUMMARY OF THE INVENTION

In one aspect, the present invention provides an information processing system which is adapted to reduce the necessity of modifying the existing system portion to increase the number of functions that can be used by display data obtained through a network.

In an embodiment which solves or reduces one or more of the above-mentioned problems, the present invention provides an information processing system including an information processing apparatus and an apparatus connected to the information processing apparatus, the information processing apparatus including: a processor; and a memory storing instructions which, when executed, cause the processor to act as a display control unit configured to acquire display data through a network and display a screen based on the display data, wherein the display control unit is configured to input data specified in the display data to a first application, identified by identification information specified in the display data, among a plurality of applications installed in the information processing apparatus.

Other objects, features and advantages of the present invention will become more apparent from the following detailed description when read in conjunction with the accompanying drawings.

DETAILED DESCRIPTION OF THE PREFERRED EMBODIMENTS

An embodiment of an information processing system is adapted to reduce the necessity of modifying the existing system portion to increase the number of functions that can be used by display data obtained through a network.

A web page including HTML (hypertext markup language), CSS (cascading style sheets), scripts, etc., may function as an application which causes an apparatus having downloaded the web page to execute a process in accordance with a user's input operation on a screen displayed based on the web page. Specifically, if the web page sends a request to a web browser, the web browser causes the apparatus to execute a process in accordance with the request received from the web page.

However, functions that can be requested from the web page to be supplied by the web browser are restricted to functions supported by APIs which are supplied by the web browser. Specifically, scripts that can be described in the web page are restricted to what can be interpreted by the web browser.

When a new function is implemented in an apparatus which has downloaded the web page, there is the necessity of modifying the web browser to permit supply of the interface supporting the new function to the web page in order to enable the new function to be used by the web page.

If a plug-in is used in the web browser, the necessity of modifying the web browser may be reduced. However, among web browsers provided in smart devices, such as smart phones or tablets, there are some web browsers which have no mechanism for using a plug-in therein. Hence, the embodiment of the information processing system is adapted to reduce the necessity of modifying the existing system portion to increase the number of functions that can be used by display data obtained through a network.

A description will be given of preferred embodiments with reference to the accompanying drawings.

Figure 1:
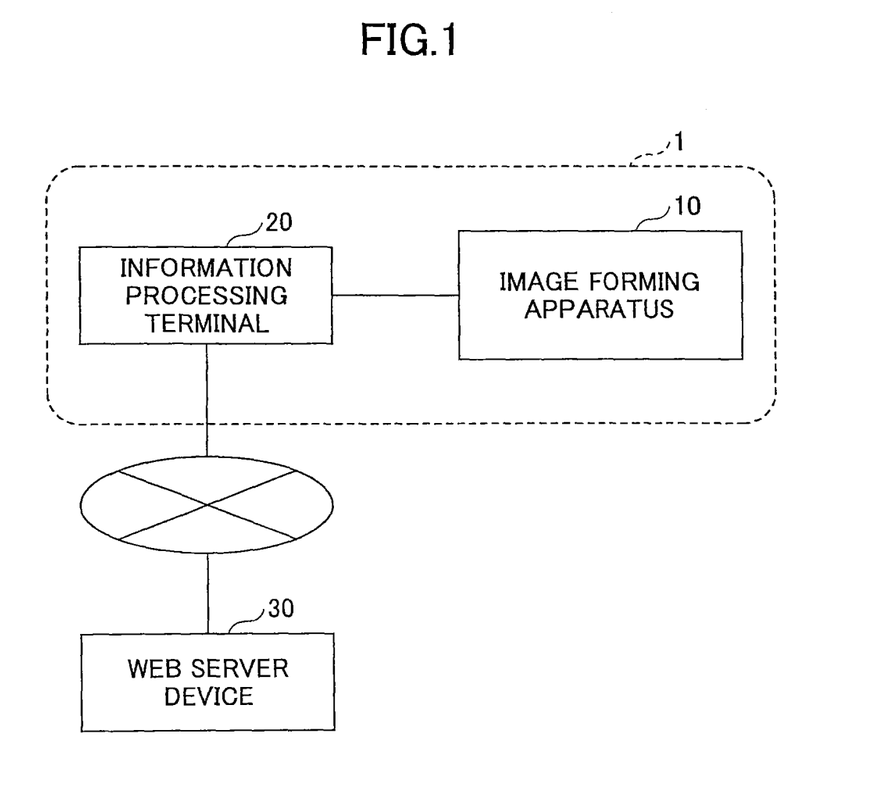
FIG. 1 is a diagram showing a configuration of an information processing system according to an embodiment.

FIG. 1 is a diagram showing a configuration of an information processing system 1 according to an embodiment. In the information processing system 1 shown in FIG. 1, an image forming apparatus 10 is connected to an information processing terminal 20 such that the image forming apparatus 10 and the information processing terminal 20 may communicate with each other. For example, the communication between the image forming apparatus 10 and the information processing terminal 20 may be performed through a USB (universal serial bus) connection, a wireless NFC (near-field communication) network or a wired or wireless LAN (local area network).

The image forming apparatus 10 may be a multifunction peripheral in which two or more of functions including a print function, a scan function, a copy function, a FAX transmission/reception function, etc., are incorporated in one casing. Alternatively, an apparatus incorporating any one of the functions may be used as the image forming apparatus 10. Moreover, the image forming apparatus 10 in this embodiment may be an example of a network apparatus. Instead of the image forming apparatus 10, a network apparatus, such as a projector, a TV conference system or a digital camera, may be used.

For example, the information processing terminal 20 may be a smart device which is capable of executing information processing independently, such as a smart phone or a tablet type terminal. In this embodiment, the information processing terminal 20 functions as an operation unit of the image forming apparatus 10. Specifically, the information processing terminal 20 in this embodiment is connected to the image forming apparatus 10, instead of an operation panel which is installed as a dedicated operation unit of a conventional image forming apparatus. In the following, the term "operation panel" refers to the operation panel which is installed on the conventional image forming apparatus.

For example, the information processing terminal 20 may be fixed and installed in a predetermined position of the image forming apparatus (e.g., a position where the operation panel is conventionally disposed). Hence, the information processing terminal 20 and the image forming apparatus 10 may be considered as a single apparatus, or the information processing terminal 20 may be removed (or detached) from the image forming apparatus 10. The information processing terminal 20, when removed from the image forming apparatus 10, may function as the operation unit of the image forming apparatus 10 using radio communication, such as Bluetooth® or infrared communication.

As shown in FIG. 1, the information processing terminal 20 and a web server device 30 may communicate with each other via a network, such as a LAN or the Internet. The communications between the information processing terminal 20 and the web server device 30 may be mediated or relayed by the image forming apparatus 10. The web server device 30 may be a computer which stores a web page including HTML (hypertext markup language), CSS (cascading style sheets), JavaScript, etc. Generally, a web page not only serves as display data, but also serves as an application using scripts included in the web page. In this embodiment, a web page is called "web application."

Although not illustrated in FIG. 1, the information processing terminal 20 may communicate with two or more web server devices 30 or unspecified web server devices 30.

Figure 2:
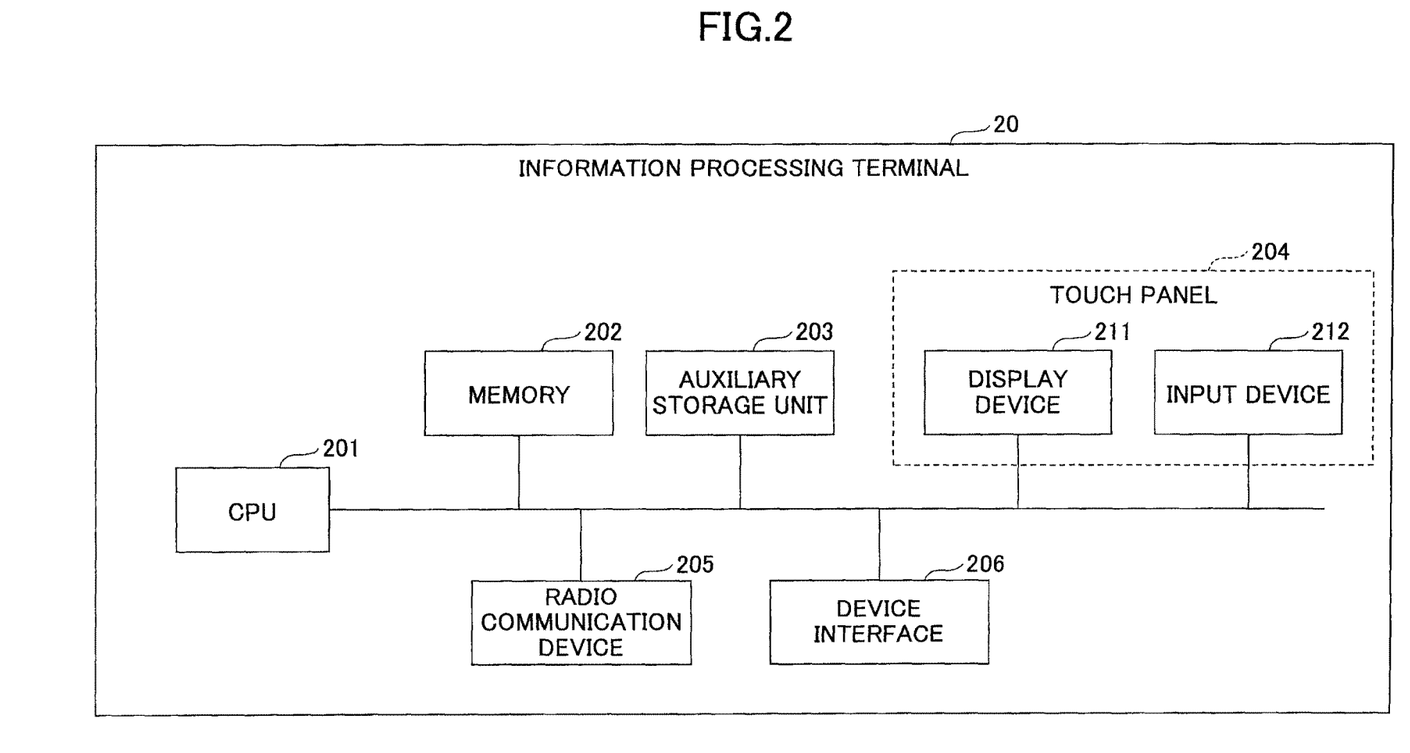
FIG. 2 is a diagram showing a hardware configuration of an information processing terminal according to an embodiment.

FIG. 2 is a diagram showing a hardware configuration of an information processing terminal 20 according to an embodiment. As shown in FIG. 2, the information processing terminal 20 generally includes a CPU 201, a memory 202, an auxiliary storage unit 203, a touch panel 204, a radio communication device 205, and a device interface 206.

The auxiliary storage unit 203 stores programs which are installed in the information processing terminal 20. The CPU 201 reads out a program from the auxiliary storage unit 203 and stores the program in the memory 202 when a starting instruction of the program is received. The CPU 201 when executing the program stored in the memory 202 is caused to perform a function associated with the information processing terminal 20.

The touch panel 204 is an electronic component having both an input function and a display function. The touch panel 204 performs displaying of information and reception of inputs from a user. The touch panel 204 generally includes a display device 211 and an input device 212.

The display device 211 may be a liquid crystal display or the like and carry out a display function of the touch panel 204. The input device 212 may be an electronic component which including a sensor that detects contact of a contact object with the display device 211. The method of detecting contact of the contact object with the display device may be any known method, such as an electrostatic method, a resistance film method or an optical method. Incidentally, the "contact object" refers to an object which is brought in contact with a contact surface of the touch panel 204. Examples of such an object include a user's finger, a dedicated stylus, a general-purpose pen, etc.

The radio communication device 205 may be implemented by an electronic component, such as an antenna, needed for performing communications via a wireless LAN or a mobile communication network. The device interface 206 may be an interface for communicating with the image forming apparatus 10. Namely, the device interface 206 may communicate with the image forming apparatus 10.

Figure 3:
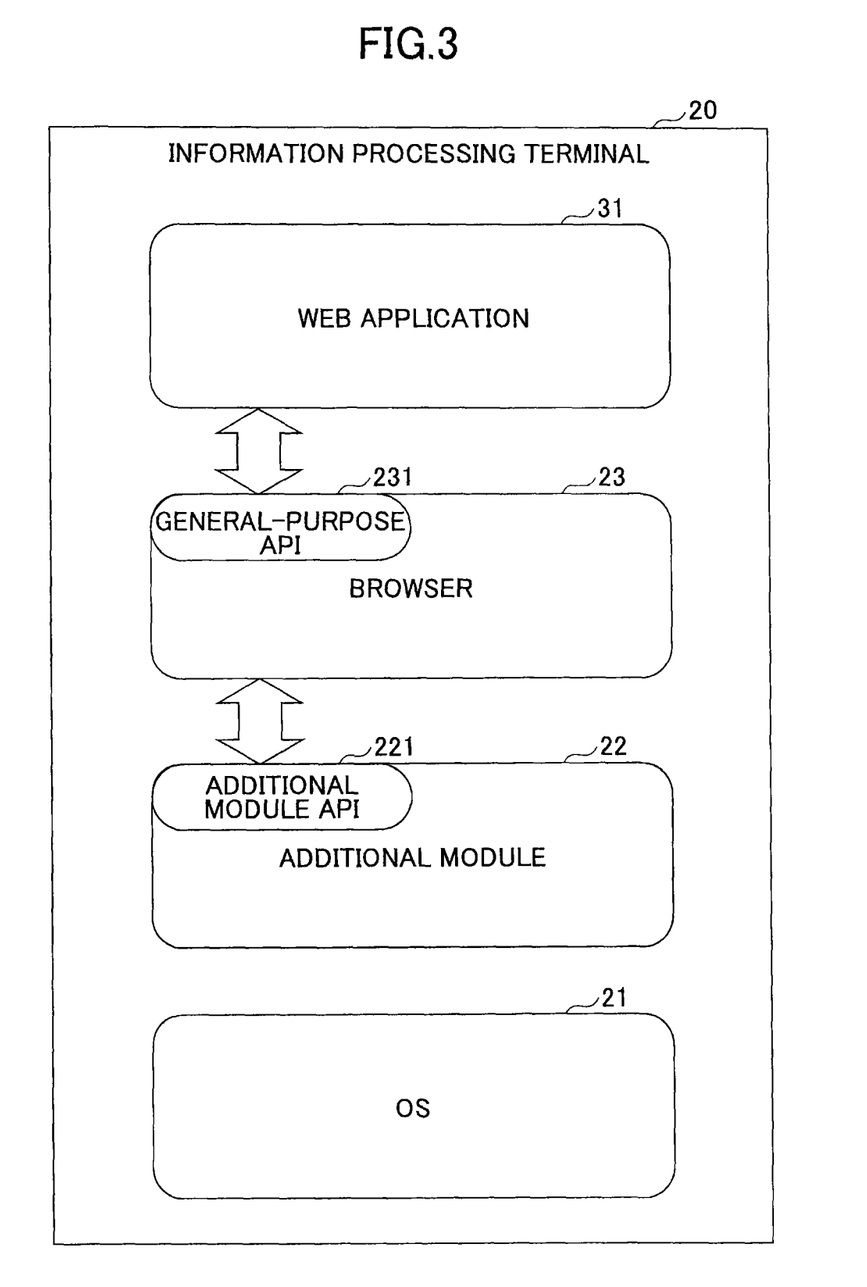
FIG. 3 is a diagram showing a software configuration of the information processing terminal according to an embodiment.

FIG. 3 is a diagram showing a software configuration of an information processing terminal 20 according to an embodiment. As shown in FIG. 3, the information processing terminal 20 includes an OS (operating system) 21, an additional module 22, and a browser 23. These software components are programs which are stored in the memory 202 or the auxiliary storage unit 203 and, when executed, cause the CPU 201 to perform processes on the information processing terminal 20.

The OS 21 is a general-purpose OS. Other programs including the additional module 22 and the browser 23 operate as processes or threads on the OS 21.

The browser 23 may be a web browser which is configured to acquire (download) a web application 31 from the web server device 30 via the network and cause the CPU 201 to display a screen on the display device 211 in accordance with definitions included in the acquired web application 31. For example, the definitions related to the screen are described using HTML (hypertext markup language), CSS (cascading style sheets), etc. Moreover, the browser 23 is configured to cause the CPU 201 to perform a process through an API (application programming interface) which is called according to the scripts included in the web application 31. Namely, the implementations (e.g., definitions of processes) for various APIs called according to the scripts are included in the browser 23. As one of such APIs, the browser 23 may include a general-purpose API 231. The general-purpose API 231 differs from other APIs in that it is not tailored to a specific function. The general-purpose API 231 may include a set of functions for enabling the web application 31 to use a function of an arbitrary additional module 22. Namely, the general-purpose API 231 provides the web application 31 with a mechanism or path for calling the additional module 22 in a transparent manner. For example, one of the functions included in the general-purpose API 231 may have the following interface:

<name of additional module call function> (module ID, input data).

The "name of additional module call function" is a name of a function for calling the additional module 22. In the following, the function for calling the additional module 22 will be called an "additional module call function". The "module ID" is identification information of the additional module 22 as a target module (calling destination). The module ID may be a file name of the additional module 22, or may be some other identification information of the additional module 22. It is adequate that the module ID is information that allows the browser 23 to identify the additional module 22. The "input data" is data that is input to the additional module 22. For example, the "input data" may be a character string. However, the content of the "input data" may not be a character string. In the interface of the function included in the general-purpose API 231, the module ID is specified as an argument, and the general-purpose API 231 is a shared API among a plurality of the additional modules 22.

After the additional module call function is called by the web application 31, the browser 23 inputs the input data specified as the argument of the additional module call function to the additional module 22 associated with the module ID specified as the argument thereof.

Moreover, another of the functions included in the general-purpose API 231 may have the following interface:
<name of callback register function> (module ID, callback function address).

The "name of callback register function" is a name of a function for registering a callback function which is an example of an interface for receiving a response or a notification from the additional module 22. In the following, the function for registering the callback function will be called a "callback register function". The "module ID" is identification information of the additional module 22 as a target module of the callback function. The "callback function address" is address information of the callback function.

The additional module 22 is an additional application program which is installed in order to extend the functions of the browser 23. The additional module 22 includes an additional module API 221 which is an API in the form planned by the browser 23. The additional module API 221 is configured to receive input data from the browser 23. The additional module 22 is configured to perform a process on the data received through the additional module API 221.

Although only one additional module 22 is illustrated in FIG. 3, a plurality of additional modules 22 may be installed in the information processing terminal 20. By installing the additional module 22, the function associated with the additional module 22 is installed in the browser 23 as a pseudo plug-in through the general-purpose API 231 of the browser 23.

Moreover, as shown in FIG. 3, the web application 31 is included in the information processing terminal 20. The web application 31 is not installed beforehand in the information processing terminal 20 but it is dynamically acquired by the browser 23 in response to a user's input operation on the information processing terminal 20. The web application 31 is configured to call the additional module 22 through the general-purpose API 231 of the browser 23. In one embodiment, one-to-one correspondence between the web application 31 and the additional module 22 may be provided in the information processing terminal 20. Namely, when it is desired to allow a certain web application 31 to use a function which cannot be performed through the existing API of the browser 23, an additional module 22 that is capable of providing the corresponding function is generated and installed in the information processing terminal 20.

Hence, the additional module 22 may be developed by a vendor of the web application 31.

Generally, a plug-in may be used as a method of extending the functions of a web browser of a PC (personal computer) and a plug-in oriented API is provided for a web browser of a PC. However, the mechanism of a plug-in is not provided for a web browser of a smart device, and it is difficult to extend the functions of the web browser of the smart device using the plug-in method. Accordingly, in this embodiment, the general-purpose API 231 and the additional module 22 are utilized instead of the plug-in method.

The general-purpose API 231 may be provided by the scripts which are described in a language that can be used by the web application 31. Moreover, the additional module API 221 may be provided in a language that can be executed on the OS 21.

The browser 23 and the additional module 22 may be installed in the information processing terminal 20 by an installation process performed by the information processing terminal 20.

Next, several processes which are performed by the information processing terminal 20 will be described. In the following, the respective programs will be described as an entity which performs the processes, for the sake of convenience of description; but strictly speaking, the CPU 201 of the information processing terminal 20 is caused to perform the processes in accordance with the programs stored in the memory 202.

Figure 4:
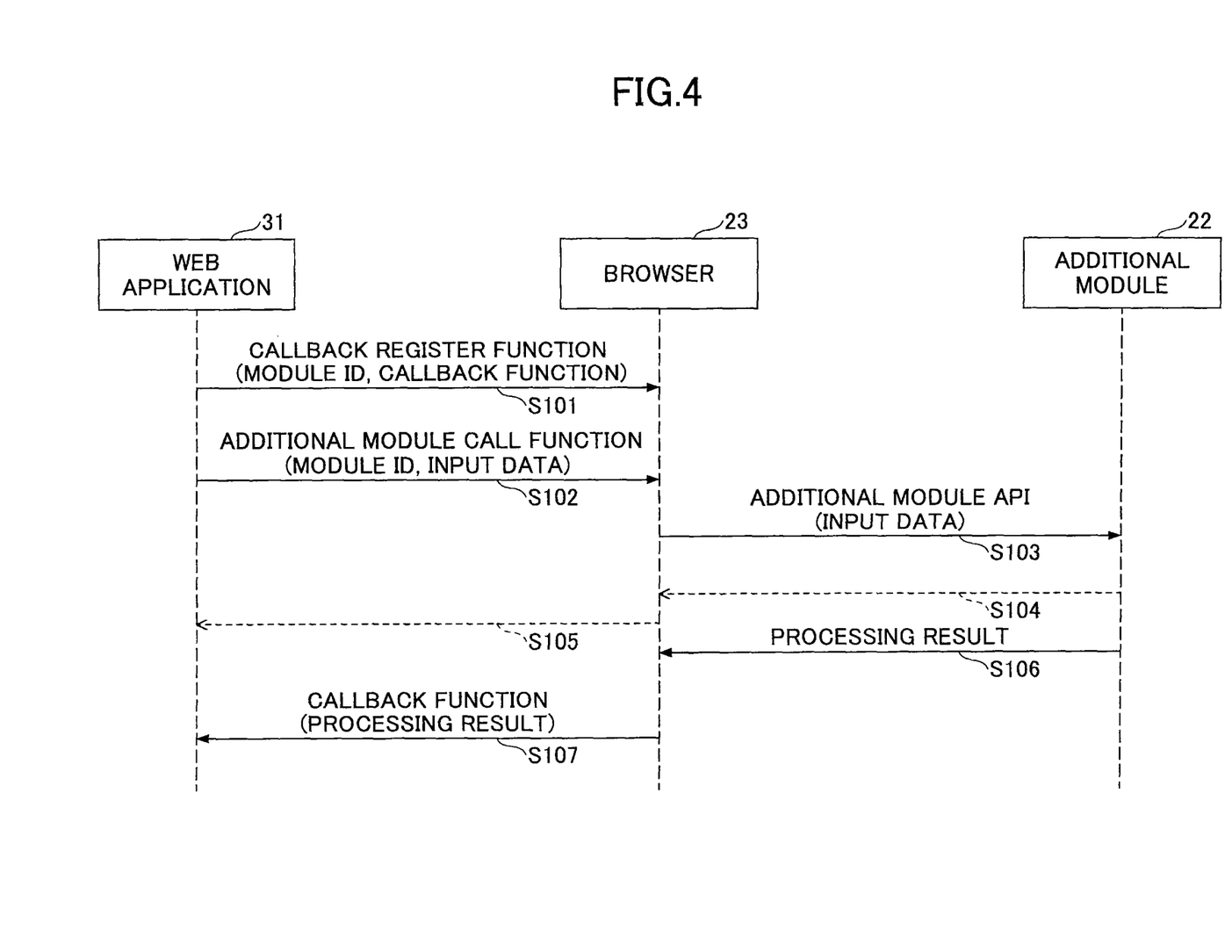
FIG. 4 is a sequence diagram for explaining a process performed by the information processing terminal when a call of an additional module from a web application is received.

FIG. 4 is a sequence diagram for explaining a process performed by the information processing terminal 20 when a call of an additional module from a web application is received. In FIG. 4, it is assumed that the information processing terminal 20 is in a state in which a web application 31 corresponding to a URL (uniform resource locator) specified in response to a user's input operation has already been acquired (or downloaded) by the browser 23. Moreover, it is assumed that a corresponding process is performed by the web application 31 based on the scripts defined in the web application 31.

As shown in FIG. 4, in step S101, the web application 31 calls a callback register function which is one of the functions included in the general-purpose API 231. In other words, the web application 31 sends a callback register function request for registering a callback function to the browser 23. In the arguments of the callback register function request, a module ID of an additional module 22 which is specified as a target module in step S102, and address information of the callback function for registration are specified. In response to the call of the callback register function, the browser 23 associates the module ID and the address information, which are specified as the arguments of the callback register function request, and stores them in the memory 202.

Subsequently, in step S102, the web application 31 calls an additional module call function which is one of the functions included in the general-purpose API 231. In other words, the web application 31 sends an additional module call function request for calling the additional module 22 to the browser 23. In the arguments of the additional module call function request, the "module ID" of an additional module 22 as a target module and the "input data" to the additional module 22 are specified.

The browser 23 inputs the input data specified in the arguments of the additional module call function request to the additional module 22 identified by the module ID specified in the arguments of the additional module call function request through the additional module API 221

(S103). In response to receiving the input data, the additional module 22 sends a response to the browser (S104). In response to receiving the response, the browser 23 sends a response to the additional module call function request to the web application (S105).

After the response is sent in step S104, the additional module 22 performs a process on the input data. After the process is performed, the additional module 22 sends a notification of a processing result to the browser 23 (S106). The processing result may be information indicating a success or a failure of the process, or may be data generated by the process. Incidentally, the browser 23 has the interface for receiving the notification of the processing result from the additional module 22.

Subsequently, the browser 23 sends to the web application 31 a callback function response corresponding to the address information which is associated with the module ID of the source of the notification of the processing result and stored in the memory 202 (S107). The processing result is specified in the arguments of the callback function response. As a result, a notification of the processing result is sent to the web application 31.

In a case where the web application 31 does not require a notification of the processing result of the additional module 22, the steps S101 and S107 in the process shown in FIG. 4 may be skipped.

In the process shown in FIG. 4, in the steps S104 and S105, a response is sent before the process related to the input data is performed by the additional module 22. In this embodiment, the additional module 22 and the browser 23 are operated in different threads or processes, and the processing of the additional module 22 and the processing of the browser 23 are asynchronous. Hence, if the notification of the processing result is sent from the additional module 22 in a synchronous manner in the step S103, the steps S104 and S105 may be skipped.

Moreover, the registration of the callback function which is performed for receiving the processing result may be skipped. This is because the browser 23 may be configured to return the processing result of the additional module 22 as a return value of the additional module call function.

Even in a case where the processing result from the additional module 22 is returned in a synchronous manner to the step S103, the registration of the callback function is needed if it is desired that the browser 23 acquires a notification which is asynchronously sent by the additional module 22.

Figure 5:
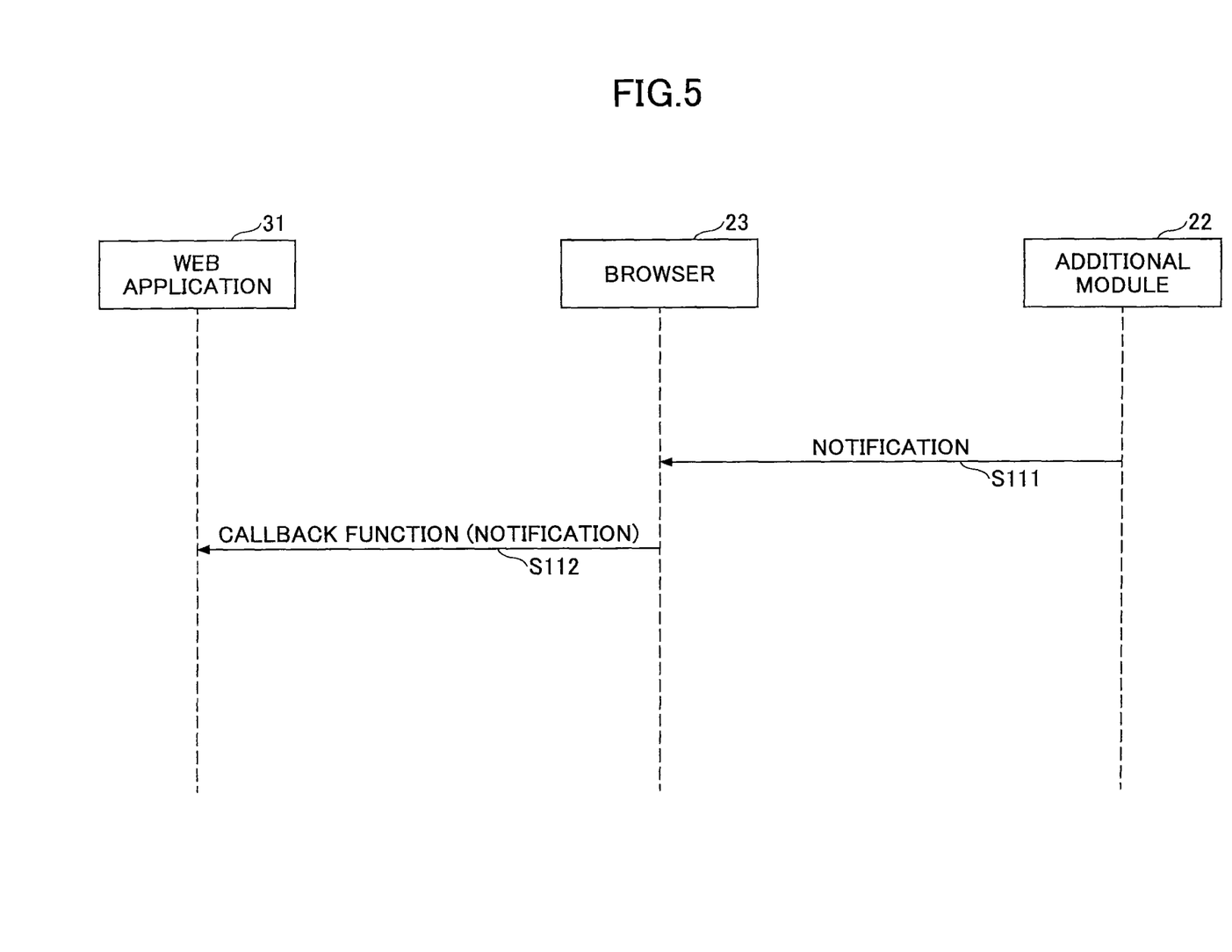
FIG. 5 is a sequence diagram for explaining a process performed by the information processing terminal when a notification from an additional module is received.

FIG. 5 is a sequence diagram for explaining a process performed by the information processing terminal 20 when a notification from an additional module is received.

For example, when occurrence of a certain event is detected by the additional module 22, a notification of the event is sent to the browser 23 (S111). Such information may be sent from the additional module 22 to the browser 23 by using an interface which is the same as the interface of the browser 23 for receiving a notification of the processing result of the additional module 22. Alternatively, the browser 23 may have an interface for receiving an asynchronous notification, which is separate from the interface for receiving the notification of the processing result.

Subsequently, the browser 23 sends to the web application 31 a callback function response corresponding to the address information which is associated with the module ID of the additional module 22 as the source of the notification of the processing result and stored in the memory 202 (S112). The processing result is specified in the arguments of the callback function response. As a result, a notification of the processing result is sent to the web application 31.

In a case where the browser 23 is configured to display two or more web applications 31 using tabs, a callback function to one additional module 22 may be registered in an overlapping manner by the web applications 31.

Figure 6:
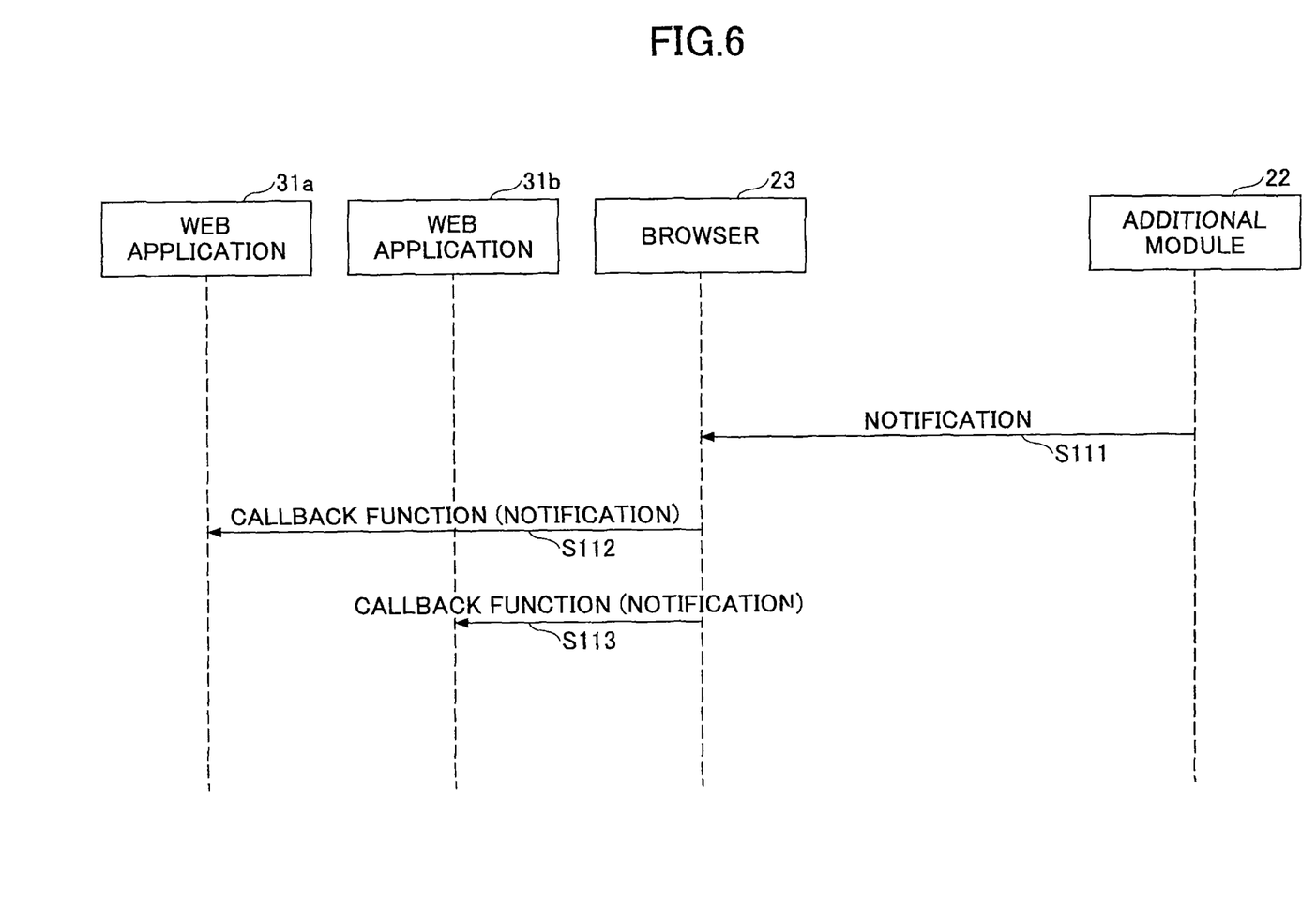
FIG. 6 is a sequence diagram for explaining another process performed by the information processing terminal when a notification from an additional module is received.

In this case, the process shown in FIG. 5 is modified to that shown in FIG. 6. FIG. 6 is a sequence diagram for explaining another process performed by the information processing terminal 20 when a notification from an additional module is received. In FIG. 6, the steps which are the same as corresponding steps in FIG. 5 are designated by the same reference characters.

The process shown in FIG. 6 is performed when two web applications 31 (a web application 31a and a web application 31b) are displayed by the browser 23 using different tabs and a callback function to the same additional module 22 is registered in an overlapping manner in the browser 23 by the web applications 31. In this case, in response to receiving a notification of a detected event from the additional module 22 (S111), the browser 23 sends to each of the web applications 31a and 31b a callback function response (S112, S113). As a result, the same information is distributed to the web applications 31a and 31b.

Next, processes which are performed by the browser 23 during the processes shown in FIGS. 4-6 will be described.

Figure 7:
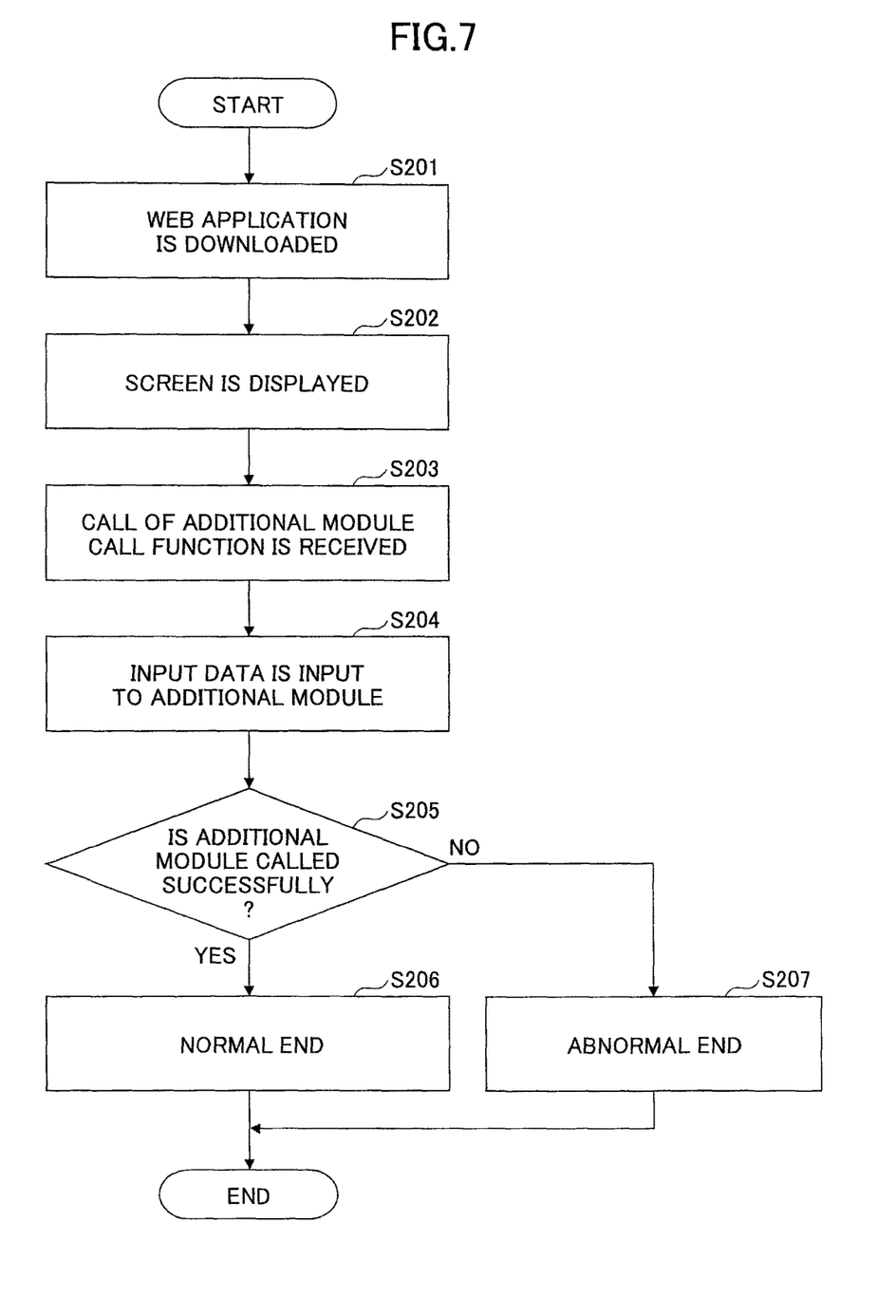
FIG. 7 is a flowchart for explaining a process performed by a browser with reference to calling an additional module.

FIG. 7 is a flowchart for explaining a process performed by the browser 23 with reference to calling an additional module.

In step S201, the browser 23 acquires (downloads) from the web server device 30 a web application 31 associated with a URL identified by a user's input operation. Subsequently, the browser 23 displays an operation screen on the display device 211 based on the definitions included in the web application 31 (S202).

Subsequently, the browser 23 receives a call of the additional module call function from the web application 31 (S203). In other words, the browser 23 analyzes the definitions in the web application 31 and detects the additional module call function. The timing of calling the additional module call function may vary depending on the definitions in the web application 31. For example, the additional module call function may be called in response to the acquisition of the web application 31, or may be called in response to a user's input operation in the operation screen displayed based on the definitions included in the web application 31.

Subsequently, the browser 23 inputs, through the general-purpose API 231, the input data specified in the arguments of the additional module call function request to the additional module 22 identified by the module ID specified in the arguments of the additional module call function request (S204). In a case where the additional module 22 as the target module does not require the input data, the argument of the input data in the additional module call function request may be omitted.

When the additional module 22 is called successfully (YES at S205), the process regarding the additional module call function request is normally terminated by the browser 23 (S206). In this case, for example, in the step S105 in FIG. 4, a response indicating a normal end is sent from the browser 23 to the web application 31.

On the other hand, when the calling of the additional module 22 fails (NO at S205), the process regarding the additional module call function request is abnormally terminated by the browser 23 (S206). In this case, for example, in the step S105 in FIG. 4 a response indicating an abnormal end is sent from the browser 23 to the web application 31.

Figure 8:
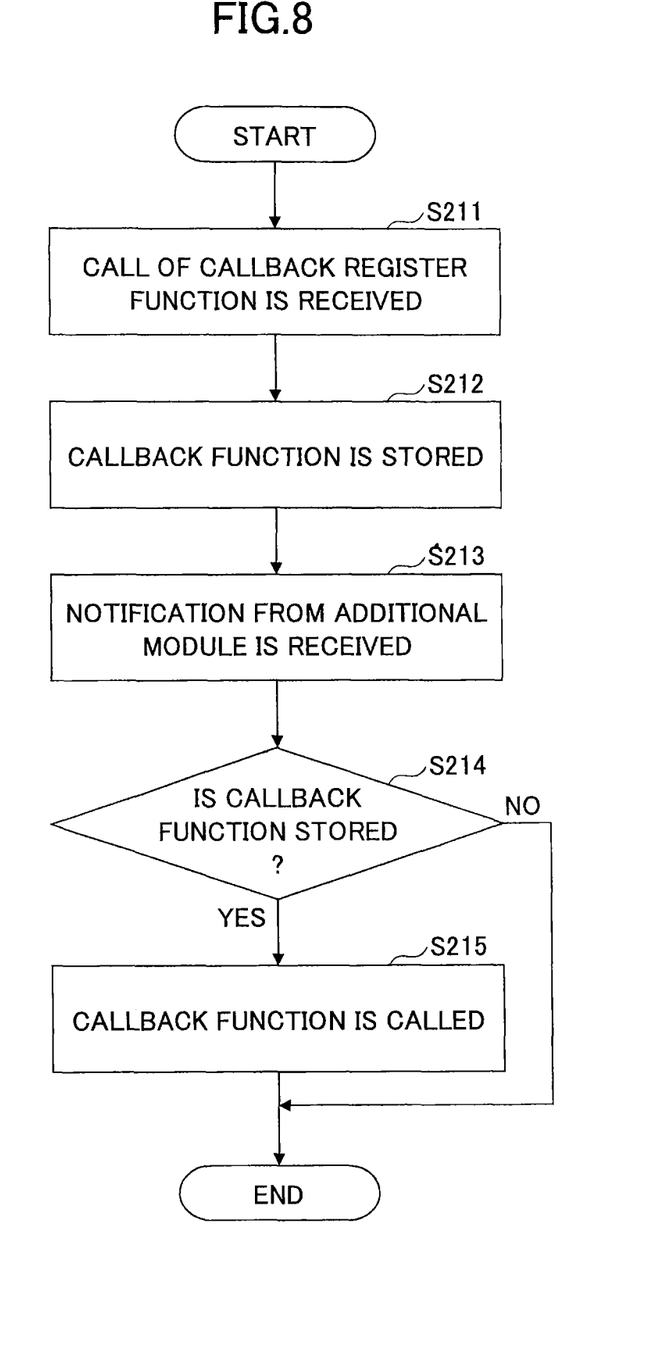
FIG. 8 is a flowchart for explaining a process performed by the browser with reference to receiving a notification from an additional module.

FIG. 8 is a flowchart for explaining a process performed by the browser 23 with reference to receiving a notification from the additional module 22.

When a call of the callback register function is received from the web application 31 (S211), the browser 23 associates the module ID and the address information of the callback function, which are specified in the arguments of the callback register function request, and stores them in the memory 202 (S212).

Subsequently, when a notification of the processing result or an asynchronous notification is received from the additional module 22 (S213), the browser 23 determines whether a callback function the address information of which is associated with the module ID of the additional module 22 is stored in the memory 202 (S214).

When the callback function is stored (YES at S214), the browser 23 calls the callback function (S215). The notified information is specified in the arguments of the callback function response. When the callback function is not stored (NO at S214), the browser 23 terminates the process of FIG. 8 without performing the step S215.

Figure 9:
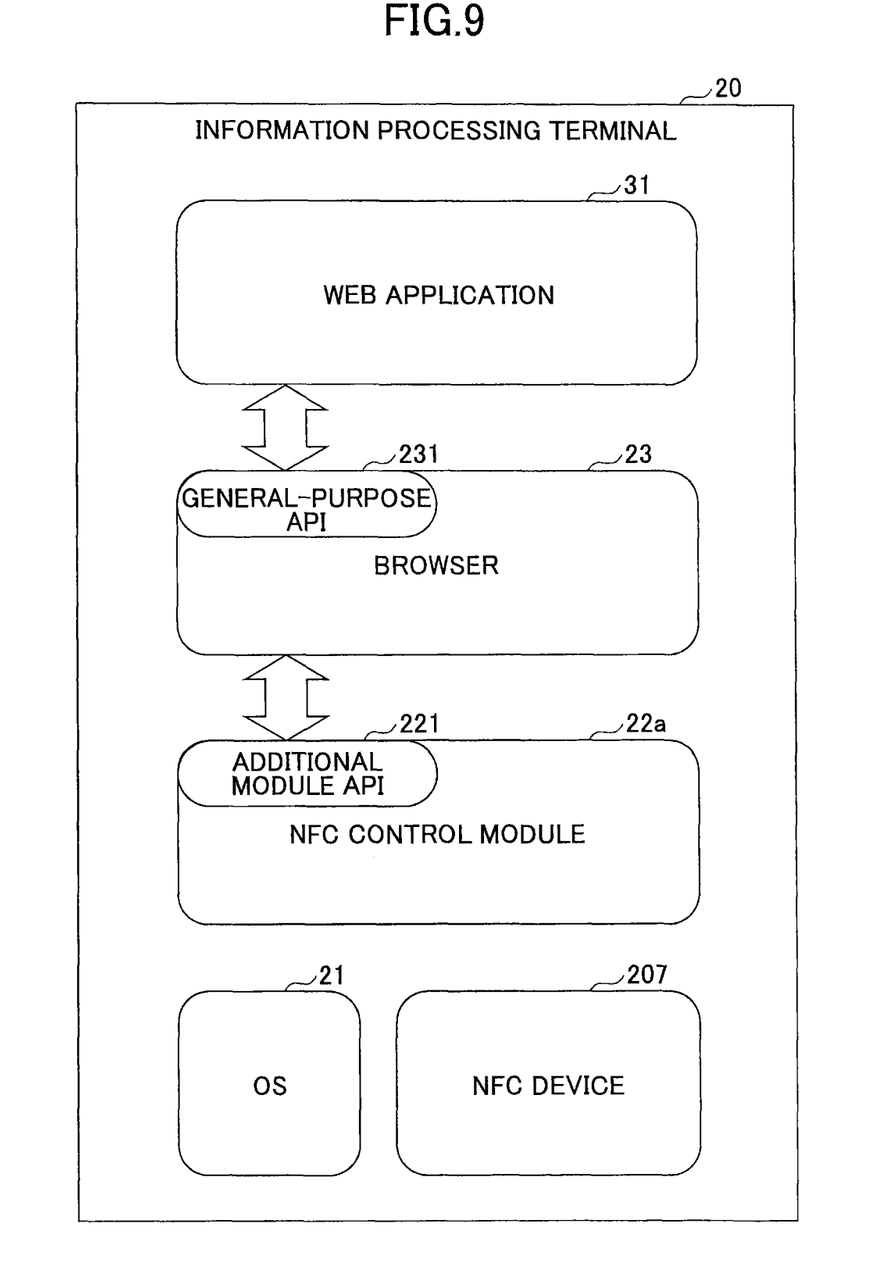
FIG. 9 is a diagram showing an example of an additional module.

Next, an example of the additional module 22 is described. FIG. 9 is a diagram showing an example of the additional module 22.

As shown in FIG. 9, an NFC (near field communication) device 207 is added to the information processing terminal 20 as the additional module 22. For example, the information processing terminal 20 initially does not include the NFC device 207 but is currently in a state where the NFC device 207 is added to the information processing terminal 20 by a USB connection or the like. Hence, an API of the scripts for accessing the NFC device 207 is not provided for the browser 23.

A method for enabling the web application 31 to use the NFC device 207 in such a case is described. The NFC device 207 is a hardware component for performing wireless near-field communications.

For example, in this case, a vendor of the web application 31 creates an NFC control module 22a for controlling the NFC device 207. Specifically, the NFC control module 22a is created to include an additional module API 221. The NFC control module 22a is installed at an arbitrary timing in the information processing terminal 20 as one of the additional modules 22.

A state in which the NFC control module 22a is installed in the information processing terminal 20 is illustrated in FIG. 9. In this state, use of the NFC control module 22a by the web application is enabled. Specifically, the web application 31 is enabled to use the NFC control module 22a through the additional module call function of the general-purpose API 231.

For example, when the process shown in FIG. 4 is performed with reference to the NFC control module 22a, a module ID of the NFC control module 22a is specified in the arguments of the callback register function request or the additional module call function request. Moreover, information indicating a request for acquiring a connection state with a communication partner is specified as the input data in the arguments of the additional module call function request. Namely, as the input data in the arguments of the additional module call function request, not only data indicating a processing object in the additional module 22 but also data indicating a processing request to the additional module 22 may be specified.

The NFC control module 22a detects a connection state of the NFC device 207 with the communication partner and sends a notification of a detection result to the browser 23 in the step S106 shown in FIG. 4. The browser 23 sends a notification of the detection result to the web application 31 using the callback function in the step S107 shown in FIG. 4. As a result, the web application 31 may recognize the connection state of the NFC device 207.

Moreover, when the process shown in FIG. 5 or FIG. 6 is performed with reference to the NFC control module 22a, examples of a notification sent from the NFC control module 22a to the browser 23 may include information indicating a change of the connection state of the NFC device 207 with the communication partner. For example, a notification indicating that connection between the NFC device 207 and the communication partner is established or that the connection between the NFC device 207 and the communications partner is canceled is sent to the web application 31 using the NFC control module 22a through the callback function.

As described above, according to the present embodiment, the web application 31 is enabled to call any of the additional modules 22 installed in the information processing terminal 20, by using the general-purpose API 231 of the browser 23. Substantially, it is possible to add the function regarding the additional module 22 to the browser 23. As a result, the necessity of modifying the existing system portion (browser 23) to increase the number of functions that can be used by the web application 31 may be reduced.

The present embodiment may be applied to a smart device that functions as an operation unit of an apparatus other than the image forming apparatus 10, such as a projector, a TV conference system, a digital camera and a home appliance. Alternatively, the present embodiment may be applied to a smart device that does not function as the operation unit of the apparatus but functions as an independent information processing terminal 20.

Moreover, the present embodiment may be applied to a web browser of a PC or a plug-in oriented web browser.

The information processing terminal 20 according to the present embodiment may be an example of an information processing apparatus. The web application (web page) according to the present embodiment may be an example of display data. The browser 23 according to the present embodiment may be an example of a display control unit.

As described in the foregoing, according to the information processing system of the present invention, it is possible to reduce the necessity of modifying the existing system portion to increase the number of functions that can be used by the display data obtained through the network.

The information processing system of the present invention is not limited to the above-described embodiments and variations and modifications may be made without departing from the scope of the present invention.

The present application is based upon and claims the benefit of priority of Japanese Patent Application No. 2014-051849, filed on Mar. 14, 2014, the contents of which are incorporated herein by reference in their entirety.

What is claimed is:

1. An information processing system including an information processing apparatus and an apparatus connected to the information processing apparatus, the information processing apparatus including an operation panel to receive instructions to control the apparatus, the information processing apparatus comprising:

a processor; and a web browser which, when executed by the processor, causes the processor to
acquire display data through a network and display a screen based on the display data, and input data included in the display data to a first application, the first application being identified by identification information included in the display data, among a plurality of applications installed in the information processing apparatus, wherein
the first application, when executed by the processor, causes the processor to control a hardware component newly added as part of the information processing apparatus, and
the data input to the first application includes information indicating a request for acquiring a connection state between the hardware component and a communication partner device,
wherein the browser is configured to receive information of the connection state between the hardware component and the communication partner device, and transmit the information of the connection state to a web application.

2. The information processing system according to claim 1, wherein the web browser causes the processor to input, through a shared application programming interface API provided for the plurality of applications, data specified by the API to the first application identified by the identification information included in the display data.

3. The information processing system according to claim 1, wherein the web browser causes the processor to send, to the web application, a notification of information regarding a process performed on the input data by the processor when executing the first application.

4. The information processing system according to claim 3, wherein the web browser causes the processor to send, through an interface registered by the web application, the notification of the information regarding the process to the display data.

5. The information processing system according to claim 1, wherein the information processing apparatus serves as an operation unit of the apparatus.

6. The information processing system of claim 1, wherein the hardware component is an NFC device, and the data input to the first application includes the information indicating the request for acquiring the connection state, which is between the NFC device and the communication partner device.

7. The information processing system of claim 1, wherein the communication partner device is a mobile device.

8. An information processing method for use in an information processing apparatus, the information processing apparatus including an operation panel to receive instructions to control an apparatus connected to the information processing apparatus, a processor, and a web browser which, when executed, causes the processor to acquire display data through a network and display a screen based on the the information processing method comprising:
inputting data included in the display data to a first application, the first application being identified by identification information included in the display data, among a plurality of applications installed in the information processing apparatus,
wherein the first application, when executed by the processor, causes the processor to control a hardware component newly added as part of the information processing apparatus, and
the data input to the first application includes information indicating a request for acquiring a connection state between the hardware component and a communication partner device,
wherein the browser is configured to receive information of the connection state between the hardware component and the communication partner device, and transmit the information of the connection state to a web application.

9. The information processing method according to claim 8, wherein the inputting includes inputting, through a shared application programming interface API provided for the plurality of applications, data specified by the API to the first application identified by the identification information included in the display data.

10. The information processing method according to claim 8, further comprising:
sending, to the web application, a notification of information regarding a process performed on the input data by the processor when executing the first application.

11. The information processing method according to claim 10, wherein the sending includes sending, through an interface registered by the web application, the notification of the information regarding the process to the display data.

12. A computer program product including a non-transitory computer-readable medium including instructions to be executed on a processor, which causes the processor to execute an information processing method for use in an information processing apparatus, the information processing apparatus including an operation panel to receive instructions to control an apparatus connected to the information processing apparatus, the processor, and a web browser which, when executed, causes the processor to acquire display data through a network and display a screen based on the display data, the information processing method comprising:
inputting data included in the display data to a first application, the first application being identified by identification information included in the display data, among a plurality of applications installed in the information processing apparatus,
wherein the first application, when executed by the processor, causes the processor to control a hardware component newly added as part of the information processing apparatus, and
the data input to the first application includes information indicating a request for acquiring a connection state between the hardware component and a communication partner device,
wherein the browser is configured to receive information of the connection state between the hardware component and the communication partner device, and transmit the information of the connection state to a web application.

13. The computer program product according to claim 12, wherein the inputting includes inputting, through a shared application programming interface API provided for the plurality of applications, data specified by the API to the first application identified by the identification information included in the display data.

14. The computer program product according to claim 12, the information processing method further comprising:
sending, to the web application, a notification of information regarding a process performed on the input data by the processor when executing the first application.

15. The computer program product according to claim 14, wherein the sending includes sending, through an interface registered by the web browser, the notification of the information regarding the process to the display data.

* * * * *